Figure 1:
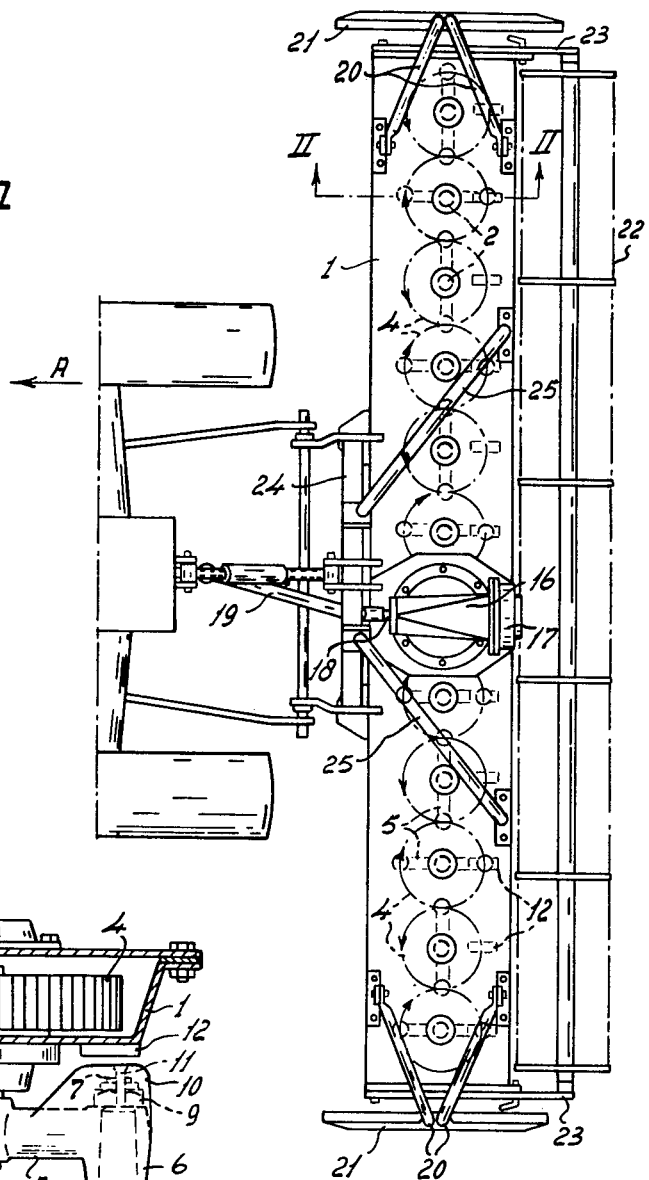

United States Patent [19]

van der Lely et al.

[11] 4,211,283
[45] Jul. 8, 1980

[54] SOIL CULTIVATING IMPLEMENTS

[75] Inventors: Ary van der Lely, Maasland; Cornelis J. G. Bom, Rozenburg, both of Netherlands

[73] Assignee: C. van der Lely N.V., Maasland, Netherlands

[21] Appl. No.: 859,850

[22] Filed: Dec. 12, 1977

[30] Foreign Application Priority Data

Dec. 16, 1976 [NL] Netherlands .................... 7613949

[51] Int. Cl.² .............................................. A01B 33/12
[52] U.S. Cl. ...................................... 172/59; 172/763; 85/35
[58] Field of Search .................... 85/35; 172/526, 523, 172/763, 39, 59, 111

[56] References Cited

U.S. PATENT DOCUMENTS

| | | | |
|---|---|---|---|
| 2,560,443 | 7/1951 | Hosford | 172/39 |
| 3,548,704 | 12/1970 | Kutryk | 85/35 |
| 3,616,862 | 11/1971 | Lely | 172/59 |
| 3,841,411 | 10/1974 | Lely | 172/59 |
| 3,897,831 | 8/1975 | Lely | 172/59 X |
| 4,053,020 | 10/1977 | Lely | 172/59 |
| 4,058,168 | 11/1977 | Lely | 172/59 |
| 4,132,274 | 1/1979 | Lely | 172/59 |

FOREIGN PATENT DOCUMENTS 2162433 7/1972 Fed. Rep. of Germany ............ 172/59

*Primary Examiner*—Richard J. Johnson
*Attorney, Agent, or Firm*—Mason, Mason and Albright

[57] ABSTRACT

A soil working member is journalled in the bottom of an elongated implement frame portion and driven to rotate about an upwardly extending axis. The member includes a horizontal support, that normally is rotated adjacent the frame portion bottom, and tines depend from the support. Each tine extends through the support to a fastening, such as a nut, adjacent an upwardly extending screen. The space between the screen and the fastening is occupied by a protective element, such as a cap or a rib, that prevents stones or other hard debris, from lodging in the space and damaging the bottom of the frame portion and/or support. Cooperating strips can be secured to the frame portion bottom to cooperate with the elements.

13 Claims, 8 Drawing Figures

U.S. Patent Jul. 8, 1980 Sheet 1 of 2 4,211,283

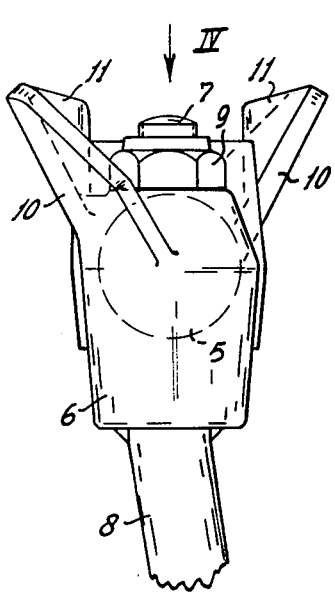
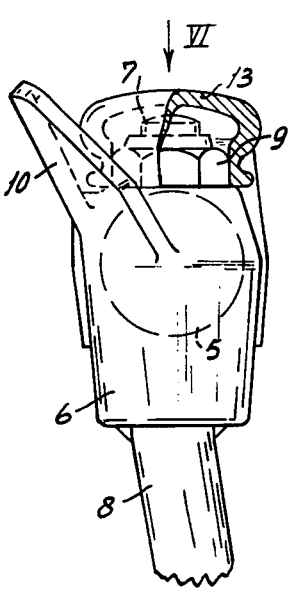
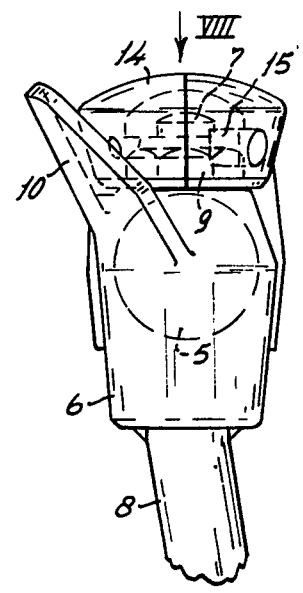
FIG. 3   FIG. 5   FIG. 7
FIG. 4   FIG. 6   FIG. 8
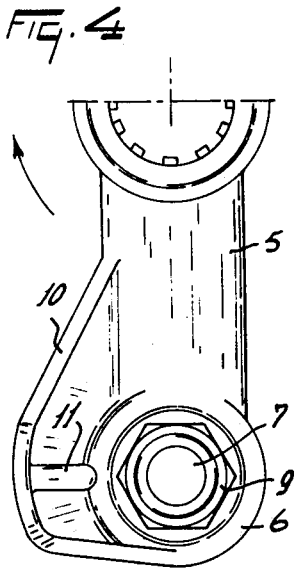
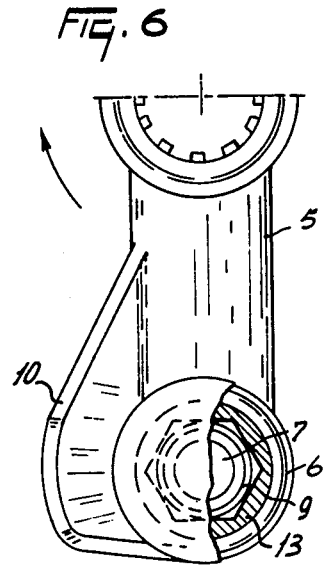
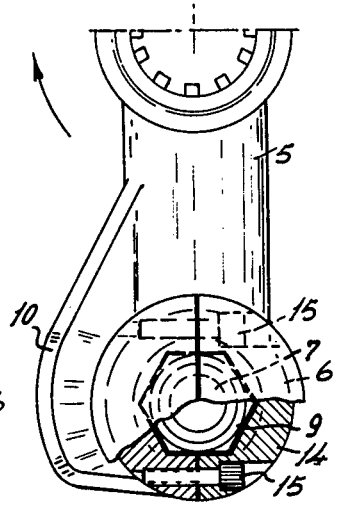

SOIL CULTIVATING IMPLEMENTS

This invention relates to soil cultivating implements or machines, such as rotary harrows, such implements or machines being of the kind which comprise a frame portion carrying a plurality of soil working members that are rotatable about corresponding upwardly extending axes, each of at least some of said members having a carrier or support for at least one tine and a screen that is inclined upwardly and forwardly at a location which is in front of fastening means of that tine with respect to the intended direction of operative rotation of the soil working member concerned, an element being disposed in the space between said tine fastening means and said screen. The expression "implement(s) or machine(s)" will be shortened to "implement(s)" alone for the sake of brevity throughout the remainder of this specification.

According to one aspect of the invention, there is provided a soil cultivating implement of the kind set forth, wherein each element at least partly fills the corresponding space when viewed in a direction that is parallel to the axis of rotation of the soil working member concerned.

Figure 2:
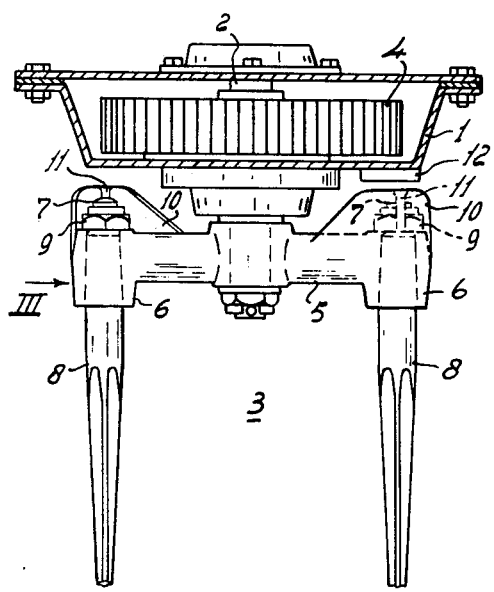

For a better understanding of the invention, and to show how the same may be carried into effect, reference will now be made, by way of example, to the accompanying drawings, in which:

FIG. 1 is a plan view of a soil cultivating implement in accordance with the invention, in the form of a rotary harrow, connected to the rear of an agricultural tractor, FIG. 2 is a section, to an enlarged scale, taken on the line II—II in FIG. 1, FIGS. 3, 5 and 7 are elevations, to an enlarged scale, as seen in the direction indicated by an arrow III in FIG. 2, the elevations of FIGS. 5 and 7 illustrating alternative embodiments to that of FIGS. 2 and 3, and FIGS. 4, 6 and 8 are views as seen in the directions indicated by arrows IV, VI and VIII in FIGS. 3, 5 and 7, respectively.

Referring to FIGS. 1 to 4 of the accompanying drawings, the rotary harrow that is illustrated therein as an example of a soil cultivating implement in accordance with the invention has a hollow box-section frame portion 1 that extends substantially horizontally transverse, and usually substantially horizontally perpendicular (as illustrated), to the intended direction of operative travel of the implement that is indicated by an arrow A in FIG. 1 of the drawings. A plurality of substantially vertical, or at least upwardly extending, shafts 2 are rotatably journalled in bearings carried by the hollow frame portion 1 and lie in a single row with their axes of rotation spaced apart from one another at regular intervals which advantageously, but not essentially, have magnitudes of substantially 25 centimeters. Each shaft 2 projects downwardly from beneath the bottom of the hollow frame portion 1, the downwardly projecting portion thereof being provided in a firmly but releasably mounted manner with a corresponding soil working member 3. In the embodiment that is being described, there are twelve of the shafts 2 and soil working members 3 so that, with the spacing between the axes of rotation of said shafts 2 that has been referred to, the harrow has a working width of substantially 3 meters. This working width is not, of course, mandatory and the harrow could have a greater or lesser number of the rotary soil working members 3 with a consequentially increased or decreased working width. Each shaft 2 is provided, inside the hollow frame portion 1, with a straight-toothed or spur-toothed pinion 4, the size and arrangement of the pinions 4 being such that each pinion has its teeth in mesh with those of its neighbour, or with those of both of its immediate neighbours, in the single row of twelve pinions 4. With this arrangement, each pinion 4, together with the corresponding shaft 2 and soil working member 3, will revolve in the opposite direction to its immediate neighbour, or to both of its immediate neighbours, when the harrow is in operation, these intended directions of operative rotation being denoted by arrows in FIGS. 1, 4, 6 and 8 of the drawings.

Each rotary soil working member 3 comprises a substantially horizontally extending tine carrier or support 5 that is formed midway along its length with an internally splined hub, that hub co-operating with matching external splines on the downwardly projecting portion of the corresponding shaft 2. A lowermost end of each downwardly projecting shaft portion is screwthreaded and receives a fastening nut, a washer and a split pin or the like (see FIG. 2) to prevent axial disengagement of the carrier or support 5 concerned from that shaft 2. The opposite ends of each tine carrier or support 5 are formed as substantially cylindrical tine holders 6 and each holder 6 receives a fastening portion 7 of a corresponding rigid soil working tine 8. The two tines 8 of each rotary soil working member 3 have soil working portions that project downwardly into the ground, when the harrow is in operation, from the lower ends of the respective holders 6. The soil working portions of the tines 8 are inclined to the fastening portions 7 thereof by a few degrees (for example, 8°) and are swept back rearwardly from top to bottom with respect to the intended directions of operative rotation of the corresponding soil working members 3. The fastening portion 7 of each tine 8 has a screwthreaded part at its upper end which screwthreaded part receives a co-operating fastening nut 9 that is shaped to co-operate centringly with the upper end of the respective holder 6 and that preferably, but not essentially, incorporates an insert designed to prevent the nut from working loose as a result of the operation of the harrow. The tines 8 are retained against turning about the longitudinal axes of their fastening portions 7 in the holders 6 by lugs that are provided at the lowermost ends of those fastening portions 7, said lugs being lodged in notches at the lower ends of the holders 6. The lugs in question can be seen in FIGS. 3, 5 and 7 of the drawings which Figures also illustrate the inclination of the soil working portions of the tines 8 to the fastening portions 7 thereof.

The top and front of each tine holder 6, with respect to the intended direction of operative rotation of the soil working member 3 concerned, is provided with a screen 10 which screen is inclined upwardly and forwardly with respect to the intended direction of operative rotation concerned. Part of the upper edge of each screen 10 is contained in a plane that is parallel or substantially parallel to the longitudinal axis of the corresponding tine carrier or support 5 but, at the end of that part which is nearest to the respective shaft 2, said upper edge is inclined obliquely downwardly toward the carrier or support 5 and shaft 2 concerned and eventually merges integrally into the material of that carrier or support 5 at a location which is substantially at the top, and substantially at the front thereof with respect to the intended direction of operative rotation of the member 3 concerned. A space is formed between each fastening nut 9 and the obliquely upwardly and forwardly inclined screen 10 that lies in front of that nut 9 with respect to the intended direction of operative rotation of the corresponding soil working member 3 and, in the embodiment of FIGS. 1 to 4 of the drawings, large stones and the like are prevented from becoming lodged in said space by the provision of an element in the form of a planar rib 11. The plane of each rib 11 substantially contains the longitudinal axis of the tine fastening portion 7 that lies behind it, said rib 11 thus being mounted centrally in front of the corresponding nut 9 with respect to the direction of rotation under consideration and being rigidly secured to, or being formed integrally with, the somewhat concave rear surface of the respective screen 10. The rear upright edge of each rib 11 is quite close to the corresponding nut 9 (see FIG. 4) and said rib extends generally in the intended direction of operative rotation of the soil working member 3 concerned, actually being so disposed as to be substantially tangential to an imaginary circular cylindrical figure whose axis coincides with the axis of rotation of the member 3 under consideration. The upper edge of each rib 11 is inclined downwardly and rearwardly at a few degrees to the horizontal from the upper edge of the corresponding screen 10 but the leading extremity of said upper edge of each rib 11 is at substantially the same horizontal level as in the previously discussed top part of the upper free edge of the respective screen 10. If a small stone should become temporarily lodged against one of the ribs 11, the co-operation of that rib 11 (and of the corresponding screen 10) with an ejection member 12 (FIGS. 1 and 2) should dislodge the small stone to enable it to fall away or at least move it to a position in which it will not make damaging contact with the lower surface of the hollow frame portion 1. One ejection member 12 is provided for each of the rotary soil working members 3 and is in the form of a rectangular strip whose longitudinal axis is contained in a substantially vertical plane that is parallel to the direction A and that also contains the axis of rotation of the shaft 2 which lies in front of it in said direction A. The rectangular strips that afford the ejection members 12 are welded or otherwise rigidly secured to the lower surface of the hollow frame portion 1 and each of them conveniently has dimensions of three centimeters by four centimeters.

In the embodiment of FIGS. 5 and 6 of the drawings, the ribs 11 are omitted and, instead, a synthetic plastics cap 13 is provided to cover the fastening means of each tine 8 that comprises the corresponding nut 9 and the co-operating upper screwthreaded end part of the tine fastening portion 7. The substantially spherically domed top of each cap 13 lies above the fastening means that has just been mentioned and its uppermost extremity is at a level which is the same as, or just beneath that of, said top part of the upper edge of the respective screen 10. The diameter of each cap 13 is larger at its top than at its bottom, the latter being shaped internally to engage around the flats of the fastening nut 9 concerned as a tight, but releasable, push-on fit. It can be seen in FIGS. 5 and 6 of the drawings that the upper part of each synthetic plastics cap 13 partially fills the space that otherwise extends between the corresponding nut 9 and the curved rear surface of the co-operating screen 10 thus substantially preventing any stones which are large enough to cause damage to the bottom of the hollow frame portion 1 from becoming lodged in that space.

FIGS. 7 and 8 of the drawings illustrate a third embodiment in which the fastening means of each tine 8 that comprises the corresponding nut 9 and the screwthreaded upper end of the tine fastening portion 7 upon which that nut 9 is mounted is completely surrounded by a cap 14 which may be formed from metal or preferably, from a substantially rigid synthetic plastics material. As in the case of the caps 13, the top of each cap 14 is domed in a substantially spherically curved manner although the radius of such spherical curvature is less in the case of the caps 14 than it is in the case of the caps 13. Each cap 14 has a smaller diameter at its lower end than it does at the base of the substantially spherically domed top thereof, the uppermost extremity of said top being at substantially the same horizontal level as the aforementioned top part of the upper edge of the respective screen 10 and thus being located at a level which is only just beneath that of the lower surface of the bottom of the hollow frame portion 1. Each cap 14 has a diameter of progressively increasing magnitude considered upwardly from the bottom thereof to the level of the base of the substantially spherically domed top thereof and thus fills, to a large extent, the space which would otherwise extend between the nut 9 and the curved rearwardly facing surface of the corresponding obliquely upwardly and forwardly inclined screen 10. Thus, once again, it is almost impossible for any stone or the like of sufficient size to cause damage to the bottom of the hollow frame portion 1 to lodge in said space.

Each cap 14 comprises two symmetrically similar, but not identical, portions which are so arranged that the plane of contact therebetween when said portions are assembled together, is a substantially vertical plane that is parallel to the axis of rotation of the soil working member 3 concerned and that preferably coincides with, or at least is in non-perpendicular relationship with, a plane that contains said axis of rotation and the longitudinal axis of the respective tine fastening portion 7. One of the two portions of each cap 14 comprises two parallel internally screwthreaded bores while the other co-operating portion comprises two plain but shouldered bores that will register with the screwthreaded bores in the first portion when the cap is assembled. Bolts 15 are entered in the registering bores to secure the two portions to one another, said bolts 15 being of the type whose heads are axially recessed for co-operation with hexagon or like keys. The ejection members 12 are not provided when the embodiment of FIGS. 7 and 8 of the drawings is to be employed and, thus, the spacing between the uppermost extremities of the two-part caps 14 and the lower surface of the bottom of the hollow frame portion 1 is preferably minimal. The two-part construction of each cap 14 enables the caps to be installed, and removed, quite easily despite this close proximity to the bottom of the hollow frame portion 1.

One of the center pair of twelve rotary shafts 2 has an upward extension through the top of the hollow frame portion 1 into a gear box 16 that is secured in position on top of the frame portion 1. Bevel or other pinions (not visible) within the gear box 16 place the upward extension of one of the shafts 2 that has just been mentioned in driven connection with a substantially horizontal shaft (not visible) that extends parallel or substantially parallel to the direction A. The rearmost end of this substantially horizontal shaft, together with the rearmost end of an overlying, spaced, but parallel, shaft 18, projects through a rear wall of the gear box 16 into a change-speed gear 17 that is secured to the back of the gear box 16. The portions of the two shafts that project into the change-speed gear 17 are splined for co-operation with the matchingly splined hubs of a pair of straight-toothed or spur-toothed pinions (not visible) that are of different sizes. At least two pairs of such pinions of different sizes are preferably provided and said pairs of co-operating pinions are exchangeable for one another, and are interchangeable in position on the shaft ends, to enable several different transmission ratios to be obtained between the shaft 18 and the underlying parallel shaft. The leading end of the shaft 18, with respect to the direction A, projects forwardly from the front of the gear box 16 and is splined or otherwise keyed to enable it to be placed in driven connection with the rear power take-off shaft of an agrigultural tractor or other operating vehicle by way of an intermediate telescopic transmission shaft 19, which is of a construction that is known per se, having universal joints at its opposite ends. The change-speed gear 17 can thus be employed to drive the rotary soil working members 3 at any chosen one of a number of different speeds in response to a substantially constant speed of rotation that is applied to the leading end of the rotary input shaft 18 of the gear box 16. Substantially vertically disposed shield plates 21 are arranged at locations which are short distances beyond the opposite ends of the row of soil working members 3 and have lower edges which are shaped to slide forwardly over the ground in the direction A during operation of the rotary harrow or rearwardly relative to that direction during manoeuvring. Each shield plate 21 is connected to pivotal mountings on the top of the hollow frame portion 1 by a corresponding pair of arms 20, said pairs of pivotal mountings each being arranged to define a substantially horizontal axis that is in parallel or substantially parallel relationship with the direction A. Thus, during operation, each shield plate 21 can move upwardly and downwardly about the corresponding pivotal axis to match undulations in the surface of the ground over which the rotary harrow is operatively travelling. The two tines 8 of each soil working member 3 are spaced apart from one another by a slightly greater distance than the spacing (preferably substantially 25 centimeters) between the axes of rotation of neighbouring shafts 2 so that the strips of land that are worked by the individual members 3 overlap one another to form, in effect, a single broad strip of worked soil. The shield plates 21 co-ope-rate with the soil working members 3 at the opposite ends of the row of twelve members in ensuring that the soil at the margins of this broad strip of worked land is as well crumbled as is the soil at locations which are nearer to the centre of the broad strip and also act to minimise ridging of the earth at the margins of the broad strip and to prevent stones and like potentially injurious or damaging items from being flung laterally of the path of travel of the harrow by the tines 8 of its rapidly rotating soil working members 3.

The opposite ends of the hollow frame portion 1 are closed by substantially sector-shaped side plates that extend substantially vertically parallel to one another and parallel or substantially parallel to the direction A. Substantially horizontally aligned pivots are provided at or near the fronts of the side plates with respect to the direction A and arms 23 are turnable upwardly and downwardly about said pivots alongside said plates. The arms 23 extend generally rearwardly with respect to the direction A from their pivots and project some distance behind the rear edges of the side plates of the hollow frame portion 1. Substantially horizontally aligned bearings at the rear ends of the arms 23 carry a rotatable supporting member of the harrow, in the form of an openwork cage-formation roller 22, and the level of the substantially horizontal axis of rotation of the roller 22 relative to that of the hollow frame portion 1 and soil working members 3 is determined by entering substantially horizontal locking pins, or equivalent locking bolts, through holes in the arms 23 and chosen ones of curved rows of holes in rear edge regions of the sector-shaped side plates of the hollow frame portion 1, the level which is chosen being a principal factor in determining the maximum depth of penetration of the tines 8 of the rotary soil working members 3 into the ground which is possible when the rotary harrow is in use. The front of the hollow frame portion 1, with respect to the direction A, is provided, midway between the planes of its two side plates, with a coupling member or trestle 24 that is of generally triangular configuration as seen in front or rear elevation. The coupling member or trestle 24 is constructed and arranged to enable the harrow to be connected to the rear three-point lifting device or hitch of an agricultural tractor or other operating vehicle in the generally known manner which is illustrated somewhat diagrammatically in FIG. 1 of the drawings. Locations that are near to the apex of the coupling member or trestle 24 are rigidly and strengtheningly connected to well spaced apart locations at the top and rear of the hollow frame portion 1 by a pair of downwardly and rearwardly divergent tie beams 25.

In the use of the rotary harrow that has been described, its coupling member or trestle 24 is connected to the three-point lifting device or hitch at the rear of an agricultural tractor or other operating vehicle and the rotary input shaft 18 of the gear box 16 is placed in driven connection with the rear power take-off shaft of the same tractor or other vehicle through the intermediary of the known telescopic transmission shaft 19 that has universal joints at its opposite ends. Adjustments that may, if necessary, be made before work commences include setting the speed at which the soil working members 3 will revolve, in response to a substantially constant speed of rotation applied to the shaft 18, by selecting an appropriate pair of pinions for use in the change-speed gear 17 and an appropriate arrangement thereof, and also setting the maximum depth of penetration of the soil working member tines 8 into the ground by appropriate upward or downward pivotal displacement of the arms 23, the adopted setting being maintained by the locking pins (or by equivalent locking bolts) that can be seen in FIG. 1 of the drawings. These adjustments are usually made having regard to the nature and condition of the soil that is to be cultivated and the particular purpose for which that soil is required after treatment. As the harrow moves operatively in the direction A over land that is to be cultivated, stones and, occasionally, other hard objects within the soil are frequently engaged by the screens 10 of the soil working members 3 and, due to the oblique disposition of those screens 10, will be urged downwardly to a lower depth in the soil. Thus, few stones reach the fastening means of the tines 8 that are located at the upper ends of the holders 6 and behind the protecting screens 10. However, in prior art constructions, stones that are of sufficient size and strength to cause significant damage to the bottom of the hollow frame portion 1 have found their way laterally into the spaces that lie between nuts that are equivalent to the nuts 9 and screens that are equivalent to the screens 10, such stones becoming lodged in those spaces and then damaging the overlying frame portion 1. In order to avoid this danger, said spaces are at least partially filled by elements in the form of the ribs 11 or the caps 13 or 14, said elements being substantially completely successful in preventing stones and the like that are of sufficient size and strength to cause damage to the frame portion 1 from becoming lodged between the screens 10 and said fastening means. In the embodiment of FIGS. 1 to 4 of the drawings, the elements are in the form of the flat substantially planar ribs 11 which ribs are arranged centrally of said spaces in front of the nuts 9 with respect to the intended directions of operative rotation of the corresponding members 3. The inclined upper edges of the ribs 11 are at a higher horizontal level than are the upper ends of the screwthreaded upper parts of the tine fastening portions 7 and stop all but very small stones, which are not likely to cause damage, from getting laterally into what remains of the open space between each nut 9 and the curved rear surface of the corresponding screen 10. Any such small lodged stone which might project upwardly sufficiently far to cause scratching or minor denting of the bottom of the hollow frame portion 1 will almost immediately strike the co-operating non-rotary strip-shaped ejection member 12 that is located behind the corresponding shaft 2 with respect to the direction A and will either be dislodged by that member 12 or will have the upwardly projecting and potentially damaging part thereof broken away. In the embodiments of FIGS. 5/6 and 7/8 of the drawings, the ribs 11 are replaced by the caps 13 or 14 both of which are preferably formed from a substantially rigid synthetic plastics material which will, nevertheless, have some small degree of resiliency, particularly in the domed top portion thereof. The caps 13 and 14 fill the previously discussed spaces to a large extent thus leaving insufficient room for any but very small stones to become lodged in those spaces, such very small stones being most unlikely indeed to cause any significant damage. In the embodiment of FIGS. 7 and 8 of the drawings, the two-part construction of each cap 14 allows the uppermost extremity of the top thereof to be very close indeed to the lower surface of the bottom of the frame portion 1 because the two parts of the cap can be installed, or removed, laterally and it is not necessary to leave a sufficiently wide gap to allow for upward and downward movements thereof during installation and removal.

Although certain features of the three rotary harrow embodiments that have been described and/or that are illustrated in the accompanying drawings will be set forth in the following claims as inventive features, it is emphasised that the invention is not necessarily limited to those features and that it includes within its scope each of the parts of each rotary harrow embodiment that has been described, and/or that is illustrated in the accompanying drawings, both individually and in various combinations.

What we claim is:

1. A soil cultivating implement comprising a frame and at least one soil working member rotatably mounted on a portion of said frame, said member including a substantially horizontal support and a downwardly extending tine on said support, said tine having an upper fastening portion that is connected to said support with fastening means located adjacent an upper side of that support, upwardly extending screening means being positioned on top of said support, immediately adjacent and in front of said fastening means with respect to the normal direction of rotation of said soil working member leaving a space on top of said support, between said fastening means and said screening means, an upwardly extending, rib-like protecting element being located in said space directly above said support, substantially centrally in front of said fastening means and said element extending from said screening means towards said fastening means.

2. An implement as claimed in claim 1, wherein said element extends in the normal direction of operative rotation of said soil working member.

3. An implement as claimed in claim 2, wherein said screening means extends upwardly from a front side of the support and said element extends up to the level of the top of the screening means, with respect to the normal direction of rotation of the soil working member.

4. An implement as claimed in claim 3, wherein said element is contiguous with the screening means.

5. An implement as claimed in claim 1, wherein the soil working member is journalled in the bottom of said frame portion and the outer surface of said bottom has an ejection member positioned to displace or break stones which become lodged between said screening means and the fastening means, during operation.

6. An implement as claimed in claim 5, wherein each ejection member is located behind the axis of rotation of the corresponding soil working member with respect to the direction of implement travel.

7. An implement as claimed in claim 5, wherein said ejection member registers with the axis of rotation of the soil working member in a direction that is parallel to the direction of travel.

8. An implement as claimed in claim 7, wherein said ejection member is a strip on the frame portion bottom.

9. An implement as claimed in claim 8, wherein said strip has cross-sectional dimensions of four by three centimeters.

10. An implement as claimed in claim 8, wherein each strip extends as far rearwardly as the rear of said frame portion.

11. A soil cultivating implement comprising a frame and at least one soil working member rotatably mounted on a portion of said frame, said member including a substantially horizontal support and a downwardly extending tine on said support, said tine having an upper fastening portion that is connected to said support with fastening means located at an upper side of that support, upwardly extending integral screening means being positioned directly above said support, adjacent and in front of said fastening means with respect to the normal direction of rotation of said soil working member, said screening means being spaced from said fastening means and a rib-like, upwardly extending protective element being located in the space between the screening means and said fastening means, said element being positioned substantially centrally in front of said fastening means and extending from said screening means rearwardly towards said fastening means.

12. An implement as claimed in claim 11, wherein said element has an inclined upper edge that extends downwardly and rearwardly.

13. An implement as claimed in claim 11, wherein said element is a planar rib located centrally in front of said fastening means, with respect to the direction of normal rotation of the soil working member, the plane of said rib substantially containing the fastening portion of said tine.

* * * * *